(12) United States Patent
Sawazaki (10) Patent No.: US 11,729,258 B2
(45) Date of Patent: Aug. 15, 2023

(54) SERVICE PROVIDING SYSTEM, SERVICE PROVIDING METHOD, MASTER NODE, AND PROGRAM

(71) Applicant: Nippon Telegraph and Telephone Corporation, Tokyo (JP)

(72) Inventor: Fumihiko Sawazaki, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 17/800,980

(22) PCT Filed: Feb. 26, 2020

(86) PCT No.: PCT/JP2020/007571
§ 371 (c)(1),
(2) Date: Aug. 19, 2022

(87) PCT Pub. No.: WO2021/171389
PCT Pub. Date: Sep. 2, 2021

(65) Prior Publication Data
US 2023/0077240 A1   Mar. 9, 2023

(51) Int. Cl.
*H04L 67/1004* (2022.01)
*G06F 9/50* (2006.01)
*H04L 47/122* (2022.01)

(52) U.S. Cl.
CPC ............ *H04L 67/1004* (2013.01); *G06F 9/50* (2013.01); *H04L 47/122* (2013.01)

(58) Field of Classification Search
CPC ... H04L 67/1004; H04L 47/122; H04L 47/00; G06F 9/50
See application file for complete search history.

(56) References Cited

U.S. PATENT DOCUMENTS 9,716,617 B1 *   7/2017   Ahuja ................. H04L 41/0803
2020/0104177 A1 *   4/2020   Inokuchi ............... G06F 9/5011

OTHER PUBLICATIONS

[No Author Listed] [online], "CNCF Cloud Native Definition v1.0," GitHub, Inc., Jun. 11, 2018, retrieved from URL <https://github.com/cncf/toc/blob/master/DEFINITION.md#%E6%97%A5%E6%9C%AC%E8%AA%9E%E7%89%88>, 8 pages.

* cited by examiner

*Primary Examiner* — Benjamin M Thieu
(74) *Attorney, Agent, or Firm* — Fish & Richardson P.C.

(57) ABSTRACT

A service provision system (10) comprises a service mesh (11) including a plurality of microservices (12), and a master node (20) that manages each of the microservices (12), and includes a task processing monitoring unit that monitors a task processing status in each of the microservices (12), a processing ratio determination unit that determines, on the basis of the task processing status in each of the microservices (12), a ratio of requests on which to perform normal task processing and requests for which to return an error from among service requests received by a most upstream microservice (12A), and a worker allocation unit that increases the number of workers in the most upstream microservice (12A) in a case where the congestion occurs.

16 Claims, 6 Drawing Sheets

SERVICE PROVIDING SYSTEM, SERVICE PROVIDING METHOD, MASTER NODE, AND PROGRAM

CROSS-REFERENCE TO RELATED APPLICATIONS

This application is a National Stage application under 35 U.S.C. § 371 of International Application No. PCT/JP2020/007571, having an International Filing Date of Feb. 26, 2020. The disclosure of the prior application is considered part of the disclosure of this application, and is incorporated by reference in its entirety into this application.

TECHNICAL FIELD

The present invention relates to a service provision system using microservices, a service provision method, a master node that manages microservices, and a program.

BACKGROUND ART

Cloud-native technologies are defined as empowering organizations to build and run scalable applications in modern, dynamic environments such as public, private, and hybrid clouds (for example, see Non-Patent Literature 1). Representative examples of cloud-native technologies include containers, service meshes, microservices, immutable infrastructure, and declarative APIs.

CITATION LIST

Non-Patent Literature

Non-Patent Literature 1: "CNCF Cloud Native Definition v1.0", [online], GitHub, Inc., [retrieved on 12 Feb. 2020], Internet <URL: https://github.com/cncf/toc/blob/master/DEFINITION.md#%E6%97%A5%E6%9C%AC%E8%AA%9E%E7%89%88>

SUMMARY OF THE INVENTION

Technical Problem

When a large number of service requests occur in the same period, the system becomes congested and signal retries also occur. Retries increase the load to be processed by the system, leading to further congestion and more severe signal retries. In this specification, this phenomenon is defined using the term "retry storm". A retry function is included in the specifications of many protocols (particularly in Layer 5 or higher with UDP transport), and a retry storm occurs unless countermeasures are taken, such as appropriately stopping retries in times of congestion.

Simultaneous calling is one example of a case where a large number of service requests occur. Simultaneous calling occurs in cases where a system experiences a large volume of traffic all at once compared to the ordinary traffic volume, and is accompanied by congestion in many cases.

More specifically, simultaneous calling occurs in situations such as when people check up on each other immediately after an earthquake, when power is restored after an outage (when the communication equipment in the area of restored power is all powered on at once, a corresponding amount of processing for connecting to the network is performed), and when live concert tickets for a popular group go on sale, for example.

The cloud-native approach to such a large volume of service requests is basically to scale out, but there is a problem in that a retry storm may occur even while scaling out, making it necessary to process service requests so that a retry storm does not occur.

Also, for equipment presumed to be installed in an on-premises environment to fulfill required conditions, such as telecommunications equipment, there is a limit to surplus resources such as a public cloud in many cases, and therefore there is a limit to the ability to scale out, which is problematic.

Moreover, if a retry storm occurs, the number of service requests increases to double the maximum number of retries, and a corresponding volume of traffic including the retries must be processed. Consequently, there is a problem in which a retry storm does not calm down easily, even if one attempts to accommodate the traffic by scaling out.

The present invention has been devised in the light of such points, and an objective of the present invention is to prevent a retry storm from occurring when there is a large volume of service requests.

Means for Solving the Problem

A service provision system according to the present invention is characterized by comprising: a service mesh including a plurality of microservices connected in series; and a master node that manages each of the microservices, wherein each microservice includes a plurality of workers that perform predetermined task processing and a load balancer that assigns a task received from upstream to one of the workers, the master node includes a task processing monitoring unit that monitors the task processing status in each of the microservices and detects the occurrence of congestion in the service mesh, a worker allocation unit that determines an allocation of the number of workers to each of the microservices, and a processing ratio determination unit that determines, on the basis of the task processing status in each of the microservices, a ratio of requests on which to perform normal task processing and requests for which to return an error to the source of a service request from among service requests received by a most upstream microservice positioned farthest upstream in the service mesh, the worker allocation unit increases the number of workers in the most upstream microservice in the case where the congestion occurs, and the workers in the most upstream microservice process the service requests on the basis of the ratio determined by the processing ratio determination unit.

Effects of the Invention

According to the present invention, it is possible to prevent a retry storm from occurring when there is a large volume of service requests.

DESCRIPTION OF EMBODIMENTS

Next, an embodiment for carrying out the present invention (hereinafter referred to as the "present embodiment") will be described. First, an overview of the present invention will be described.

<Overview>

To prevent a retry storm from occurring, when congestion occurs in a system, a service provision system 10 (see FIG. 1 described later) according to the present embodiment first increases the resources for returning errors to deter service request retries.

Also, the service provision system 10 according to the present embodiment increases the resources for returning errors to deter service request retries, gradually increases (scales out) resources for normal service processing while reducing the resources for returning errors little by little to increase the processing capacity for normal service processing. With this arrangement, congestion is brought under control by decreasing the total number of requests and also decreasing the number of error returns. Scaling out is performed by prioritizing microservices positioned downstream in a series of processes so that traffic processed (incurring costs) on the upstream side can be processed reliably.

Furthermore, the service provision system 10 according to the present embodiment learns the trend of resource allocation when the current congestion occurs, and by allocating resources on the basis of the learning result when congestion occurs the next time, the service provision system 10 is capable of responding to congestion rapidly.

Embodiment

Figure 1:
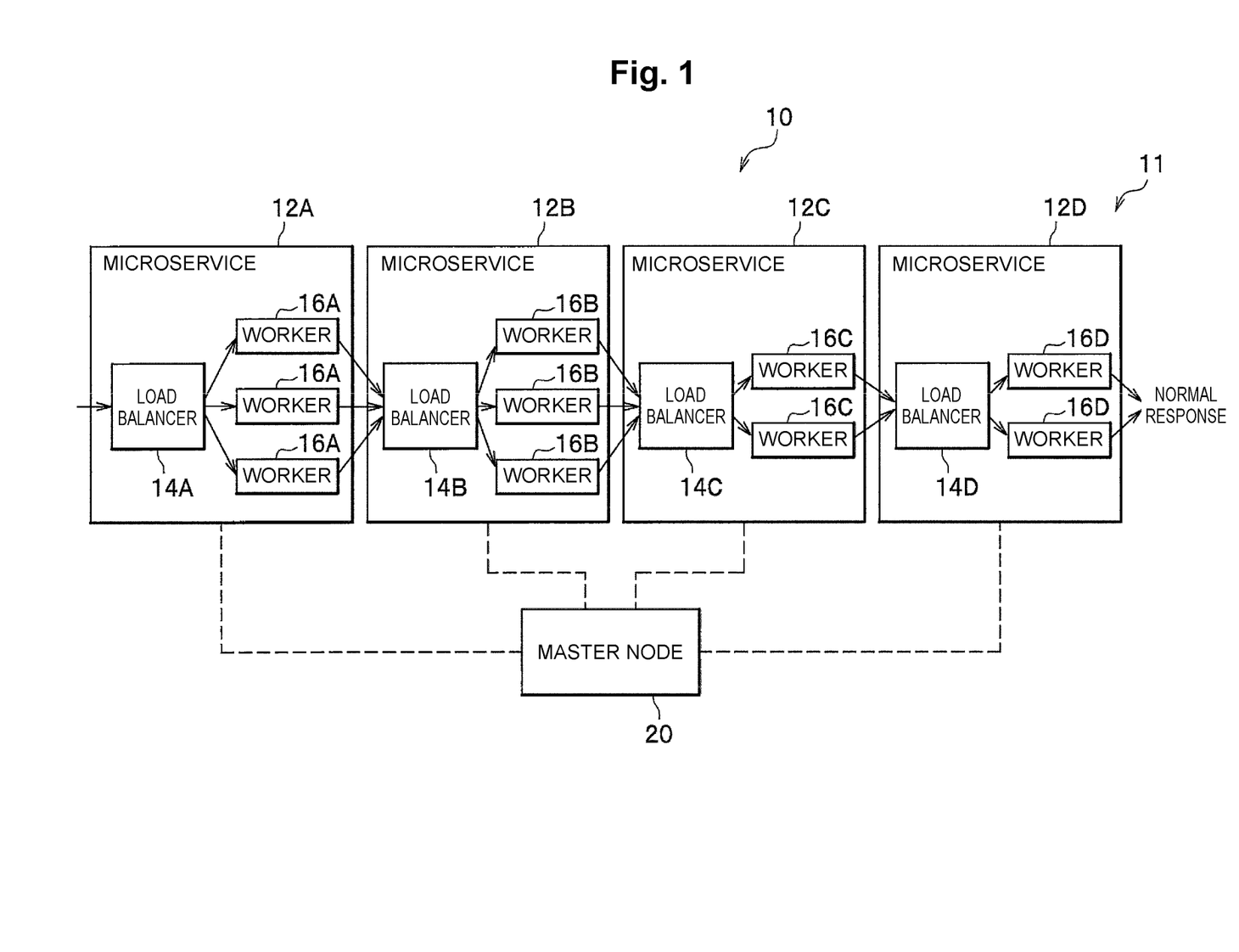
FIG. 1 is a diagram illustrating an overall configuration of a service provision system according to the present embodiment.

FIG. 1 is a diagram illustrating an overall configuration of the service provision system 10 according to the present embodiment.

As illustrated in FIG. 1, the service provision system 10 according to the present embodiment is provided with a plurality of microservices 12 (12A to 12D) and a master node 20 that manages each of the microservices 12.

The plurality of microservices 12A to 12D are connected in series to form a service mesh 11. In the example of FIG. 1, the most upstream microservice that is farthest upstream in the service mesh 11 is the microservice 12A, followed by the microservice 12B and the microservice 12C downstream therefrom, and the most downstream microservice that is farthest downstream in the service mesh 11 is the microservice 12D.

A series of processes (services) is executed by the service mesh 11 formed by the plurality of microservices 12A to 12D. The microservices 12A to 12D execute respectively different processes, and the series of processes executed by the service mesh 11 proceeds in the sequence of the process performed by the microservice 12A, the process performed by the microservice 12B, the process performed by the microservice 12C, and the process performed by the microservice 12D.

In other words, the service provision system 10 receives a service request from a service-requesting node not illustrated with the microservice 12A, executes a series of service-related task processing with the microservices 12A to 12D, and returns a response corresponding to the service request from the microservice 12D to the service-request node.

Each microservice 12 is provided with a plurality of workers (worker nodes) 16 (16A to 16D) that perform predetermined task processing, and a load balancer 14 (14A to 14D) that assigns a task received from upstream to one of the workers 16.

In the present embodiment, the workers 16 inside the same microservice 12 are assumed to perform the same type of task processing. Also, the load balancer 14 monitors the operating status of each worker 16 inside the microservice 12, and determines a handover destination (worker 16) for a task flowing in from upstream.

Next, the master node 20 will be described.

Figure 2:
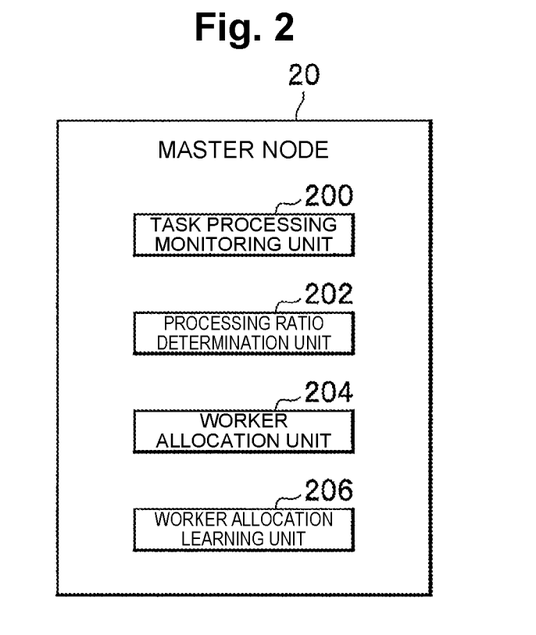
FIG. 2 is a block diagram illustrating a functional configuration of a master node.

FIG. 2 is a block diagram illustrating a functional configuration of the master node 20.

The master node 20 is provided with a task processing monitoring unit 200, a processing ratio determination unit 202, a worker allocation unit 204, and a worker allocation learning unit 206.

The task processing monitoring unit 200 monitors the task processing status in each of the microservices 12 and detects whether congestion is occurring in the service mesh 11.

Specifically, the task processing monitoring unit 200 monitors whether a queue overflow is occurring in each microservice 12 and determines that processing is being executed normally if a queue overflow is not occurring, or determines that congestion is occurring (processing is not being executed normally) if a queue overflow is occurring. Queue overflow refers to a state in which task processing by the workers 16 is backed up and no more tasks can be stored in a queue that stores tasks waiting to be executed by the workers 16.

The task processing monitoring unit 200 determines the presence or absence of a queue overflow in each microservice 12 according to any of the following three methods, for example.

<Method 1> Monitoring by Load Balancer 14

The load balancer 14 of each microservice 12 monitors for errors in data transmission from itself (the load balancer 14) to the workers 16. In the case where transmission errors occur successively within a certain time, the load balancer 14 determines that a queue overflow is occurring. The task processing monitoring unit 200 receives a notification of the determination result from each load balancer 14.

<Method 2> Monitoring by Queue Error Count

In the case where the receive error count in the queue itself can be counted, the workers 16 for example monitor the receive error count in the queue and determine that a queue overflow is occurring if the receive error count reaches a predetermined value or more within a certain time. Note that the receive error count may be monitored not only by the workers 16 but also by another function unit. The task processing monitoring unit 200 receives a notification of the determination result from each worker 16 (or from another function unit that monitors the receive error count).

<Method 3> Comparison of Amounts of Output Data Between Load Balancer 14 and Workers 16

In each microservice 12, the total amount of data handed over from the load balancer 14 to each worker 16 is compared to the total amount of data outputted by each worker 16. In the case of an ongoing state in which the amount of output data from the load balancer 14 (that is, the amount of input data into the workers 16) is significantly more than the amount of output data from the workers 16 within a certain time, the task processing monitoring unit 200 determines that a queue overflow is occurring. The task processing monitoring unit 200 receives notifications of the amounts of output data from each worker 16 and the load balancer 14 for example, and determines the presence or absence of a queue overflow through a comparison of the notifications.

Also, the task processing monitoring unit 200 determines that congestion is occurring in the service mesh 11 in the case where a queue overflow is occurring in the microservice 12A that is farthest upstream. When a queue overflow occurs in one of the microservices 12 in the service mesh 11 because of a high volume of traffic in the communication system, queue overflows also occur successively in the more upstream microservices 12 like a domino effect. Consequently, although a slight time lag exists, monitoring the most upstream microservice makes it possible to detect a queue overflow (congestion) in any location in the service mesh 11.

The processing ratio determination unit 202, on the basis of the task processing status in each of the microservices 12, determines the ratio of requests to process a task normally (hereinafter referred to as "normal processing requests") and requests to return an error to the source of a service request (hereinafter, "error return requests") among the service requests received by the most upstream microservice.

For example, in the case where congestion is not occurring in the service mesh 11, the processing ratio determination unit 202 treats all of the service requests received by the most upstream microservice as normal processing requests.

On the other hand, in the case where congestion occurs in the service mesh 11, the processing ratio determination unit 202 treats a portion of the service requests as normal processing requests, and treats the remainder as error return requests. By controlling the ratio of traffic sent downstream, less traffic is discarded partway through being processed, and an effect similar to increasing the number of workers in the downstream microservices 12B to 12D can be obtained.

Error return refers to the concept of returning SIP status code 503 to the service-requesting node, and is a reply with the message "The service is overloaded and cannot process the request. Please retry after XX minutes." for example. By transmitting such an error return, retries of the service request from the service-requesting node can be reduced.

Note that in actuality, the service request is transmitted again in many cases even after transmitting an error return to the service-request node, but in the present embodiment, such repeat transmissions of the service request are not treated as retries.

The processing ratio determination unit 202 temporarily treats all service requests as error return requests immediately after congestion occurs, for example. In this case, zero traffic is passed downstream, and the congestion downstream is alleviated. Thereafter, the processing ratio determination unit 202 gradually increases the ratio of normal processing requests. In the case where congestion reoccurs as a result of increasing the ratio of normal processing requests, the ratio of error return requests is increased. By repeating such adjustments, the processing load on the service provision system 10 is optimized gradually.

Also, as another method, the "traffic volume that originally could be processed by the worker 16A belonging to the microservice 12A" may be considered to be the "initial value of the traffic volume to send downstream" for example, and service requests exceeding this volume may be treated as error return requests. For example, provided that N is the current number of workers in the microservice 12A including surplus resources (surplus workers 18; see FIG. 3 and the like) added after congestion occurs, each worker 16A treats "above initial value/N" among the received service requests as normal processing requests, and treats the rest as error return requests.

The workers 16 in the most upstream microservice (microservice 12A) process service requests on the basis of the ratio determined by the processing ratio determination unit 202. In other words, in the case where the ratio of normal processing:error return=2:3 is determined for example, the microservice 12A sends 40% of the received service requests to downstream processing (microservice 12B), and treats returns an error for the remaining 60%.

Also, besides the method in which each worker 16 performs normal processing or error return according to a ratio as described above, the workers 16 may also be divided into workers 16A performing normal processing and workers 16A performing error return. For example, in the case where the ratio of normal processing:error return=2:3 is determined, a number of workers 16 corresponding to 40% of the workers 16 in the most upstream microservice (microservice 12A) perform normal processing while a number of workers 16 corresponding to 60% perform error return.

The worker allocation unit 204 determines the allocation of the number of workers to each of the microservices 12.

For example, in FIG. 1, there are three workers in the microservice 12A, three workers in the microservice 12B, two workers in the microservice 12C, and two workers in the microservice 12D, but the worker allocation unit 204 is capable of moving workers 16 among the microservices 12.

Also, in the case where there are usable surplus resources in the service mesh 11, the worker allocation unit 204 is capable of allocating surplus resources to any of the microservices 12 to increase the number of workers.

In the case where congestion occurs in the service mesh 11, the worker allocation unit 204 first increases the number of workers in the most upstream microservice (microservice 12A) positioned farthest upstream in the service mesh 11. To increasing the number of workers, it is assumed that usable surplus resources in the service mesh 11 are used.

This is to increase the resources that perform error return in the most upstream microservice. In other words, if there are insufficient resources in the most upstream microservice, more service requests will be discarded without performing normal processing or error return, which is one factor leading to a retry storm. Accordingly, in the present invention, the resources in the most upstream microservice are increased to at least perform error return reliably, thereby reducing service request retries and preventing a retry storm.

The worker allocation unit 204 allocates all surplus resources to the most upstream microservice (microservice 12A) immediately after congestion occurs, for example.

Additionally, when a predetermined time elapses from when the congestion occurred and the number of service requests received by the most upstream microservice (microservice 12A) falls, the worker allocation unit 204 reallocates the workers 16 from the most upstream microservice to a downstream microservice positioned downstream in the service mesh.

In this way, by devoting resources for processing related to the actual service (normal processing) at a timing when fewer resources are needed for error return, the throughput of the service provision system 10 can be improved.

At this time, the worker allocation unit 204 allocates workers with priority given to the most downstream microservice (microservice 12D) positioned farthest downstream in the service mesh 11. This is because as traffic goes farther downstream in a series of processes, a greater cost is incurred to process the traffic upstream, and discarding traffic downstream incurs an efficiency penalty on the system as a whole. By reliably processing traffic that reaches downstream, the system efficiency can be improved.

Figure 3:
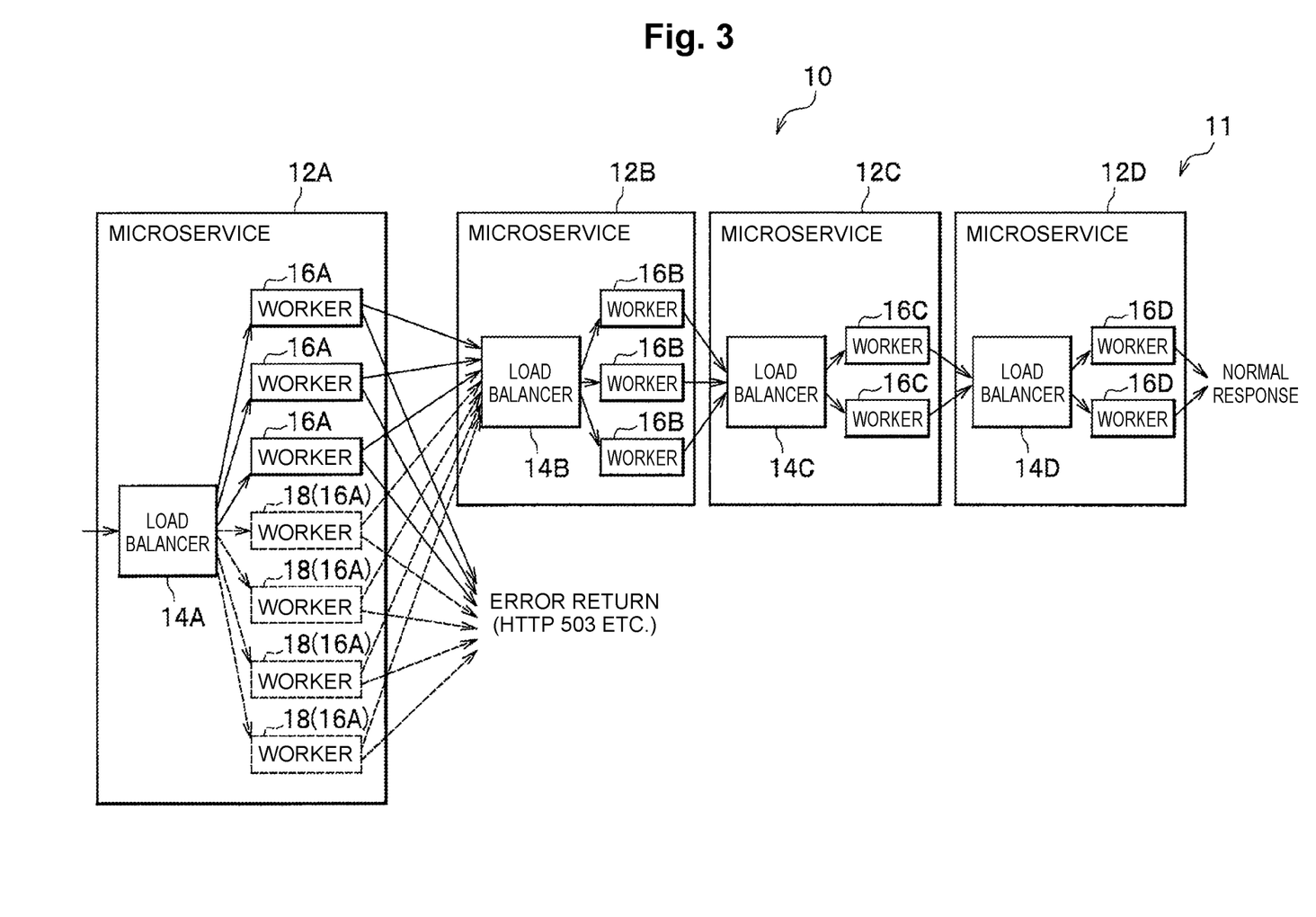
FIG. 3 is an explanatory diagram illustrating an example of worker allocation immediately after congestion occurs.

FIG. 3 is an explanatory diagram illustrating an example of worker allocation immediately after congestion occurs.

Note that in FIG. 3 and FIG. 4 described later, the master node 20 is omitted from illustration. Also, the examples of FIGS. 3 and 4 assume that four surplus workers 18 are usable.

The worker allocation unit 204 allocates all surplus workers 18 to the most upstream microservice 12A immediately after congestion occurs. As a result, the surplus workers 18 function as workers 16A of the microservice 12A. The three workers 16A originally allocated to the microservice 12A and the four newly allocated surplus workers 18 (16A) process service requests on the basis of the ratio determined by the processing ratio determination unit 202. In other words, the workers 16A return errors with respect to all service requests immediately after congestion occurs. Also, if a certain time elapses from when the congestion occurred and the service request retries are reduced, the workers 16A perform normal processing and hand over a portion of the service requests to the downstream microservice 12B, and return errors with respect to the remaining service requests.

Figure 4:
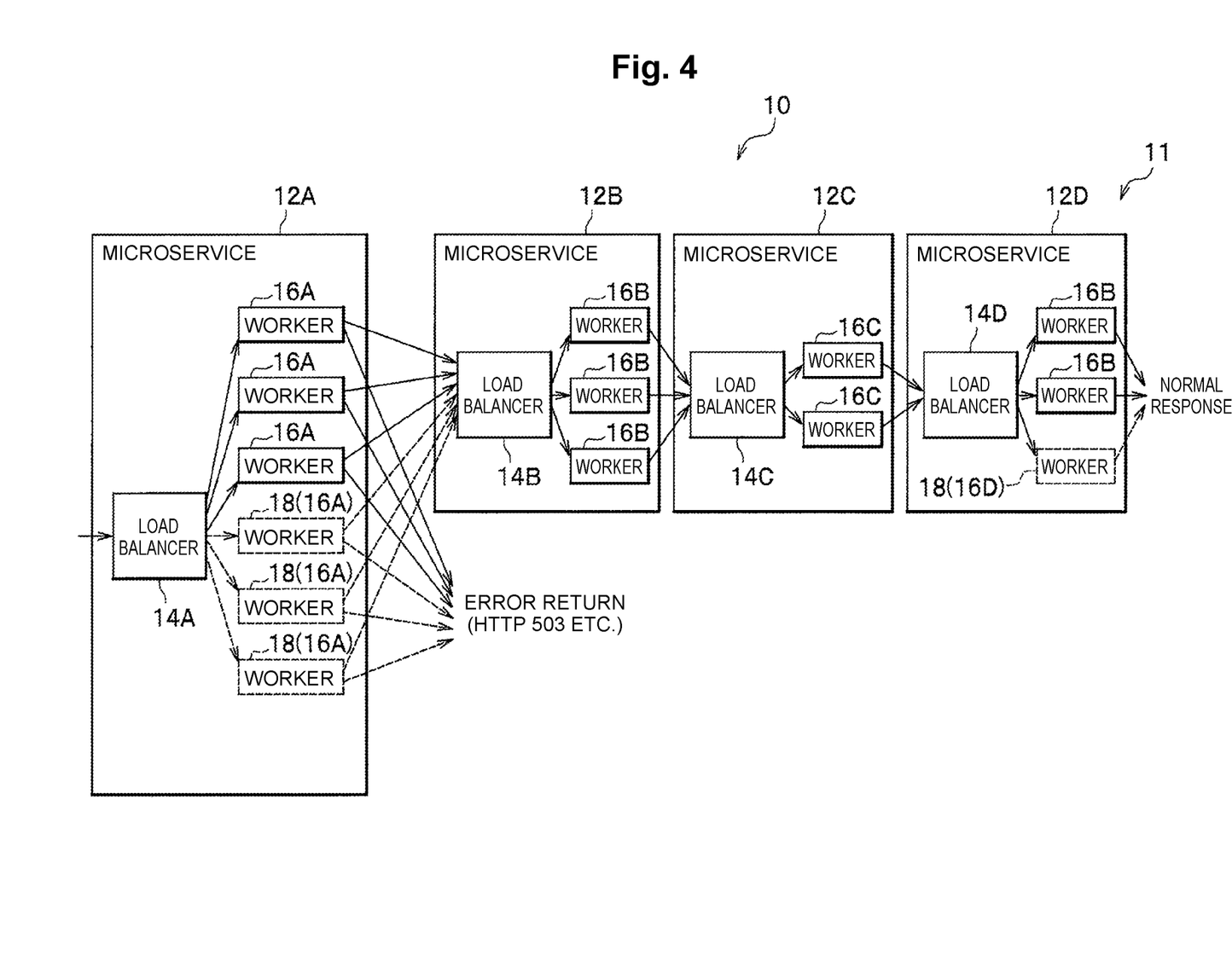
FIG. 4 is an explanatory diagram illustrating an example of worker allocation after a predetermined period elapses from the occurrence of congestion.

FIG. 4 is an explanatory diagram illustrating an example of worker allocation after a predetermined period elapses from the occurrence of congestion.

As a result of increasing the workers in the most upstream microservice and performing error return, service request retries are reduced. Accordingly, the resources for performing normal processing are gradually increased, and the total number of requests decreases. In this case, the worker allocation unit 204 allocates some of the surplus workers 18 from the most upstream microservice to the downstream microservices. In the example of FIG. 4, one of the surplus worker 18 that had been allocated to the microservice 12A is reallocated to the most downstream microservice 12D and functions as a worker 16D of the microservice 12D.

Furthermore, if a state of no congestion continues in the configuration illustrated in FIG. 4, the worker allocation unit 204 reallocates some of the surplus workers 18 from the most upstream microservice to the downstream microservices, such as the microservice 12C, for example.

In this way, in the case where the congestion calms down, the worker allocation unit 204 reallocates the workers 16 assigned to error return to the downstream microservices 12 and increases the processing capacity for normal processing.

Returning to the description of FIG. 2, the worker allocation learning unit 206 stores the number of workers in each microservice 12 before and after worker reallocation by the worker allocation unit 204.

For example, the worker allocation learning unit 206 stores the allocation of workers immediately after the occurrence of the congestion as illustrated in FIG. 3 (7, 3, 2, 2 for the microservices 12A, 12B, 12C, 12D, respectively). In addition, the worker allocation learning unit 206 stores the allocation of workers after a predetermined period elapses from the occurrence of the congestion as illustrated in FIG. 4 (6, 3, 2, 3 for the microservices 12A, 12B, 12C, 12D, respectively). At this time, the worker allocation learning unit 206 also stores the elapsed time from the occurrence of the congestion together with the allocation of workers.

A learning result obtained by the worker allocation learning unit 206 is used by the worker allocation unit 204.

For example, in the case where congestion occurs at any location in the service mesh 11 after the reallocation of workers 16 or surplus workers 18, and no workers 16 can be allocated to the affected location, the worker allocation unit 204 reverts the number of workers in each microservice 12 to that of before-reallocation on the basis of the learning result stored in the worker allocation learning unit 206.

For example, in the case where congestion occurs at any location in the service mesh 11 after changing from the worker allocation illustrated in FIG. 3 to the worker allocation illustrated in FIG. 4, the change in the worker allocation is considered to be the reason why the congestion occurred. In this case, there is a possibility that assigning additional workers 16 to the location of the congestion may clear the congestion, but if no additional workers can be added, the congestion will continue. Therefore, the worker allocation unit 204 clears the congestion by reverting the worker allocation back to the state before the congestion occurred. In this way, the worker allocation unit 204 dynamically sets an optimal number of workers at each point in time, thereby improving the processing efficiency of the system.

Additionally, when congestion occurs in the service mesh 11 in the future, the worker allocation unit 204 may determine the number of workers in each microservice 12 on the basis of the learning result stored in the worker allocation learning unit 206.

As described above, the worker allocation unit 204 dynamically changes the number of workers in each microservice 12 according to the time elapsed since the congestion occurred. The worker allocation learning unit 206 learns trends in the number of workers in each microservice 12 as time elapses from the occurrence of the congestion. When congestion occurs in the future, the worker allocation unit 204 successively applies learned content (the worker ratio) according to the time elapsed since the congestion occurred. With this arrangement, the worker allocation can be changed to deal with congestion more rapidly and accurately. In actuality, an appropriate worker allocation is learned in advance by performing load tests or the like (simulations of congestion states) before putting the service provision system 10 into operation, for example. Thereafter, in actual operation, congestion is considered to be controlled on the basis of the learning result.

Furthermore, by applying the learning result from the worker allocation learning unit 206, namely the ratio of the number of workers in each microservice 12, to another system having a different hardware configuration from the service provision system 10 for example, it is possible to take an optimal configuration more rapidly when congestion occurs.

Figure 5:
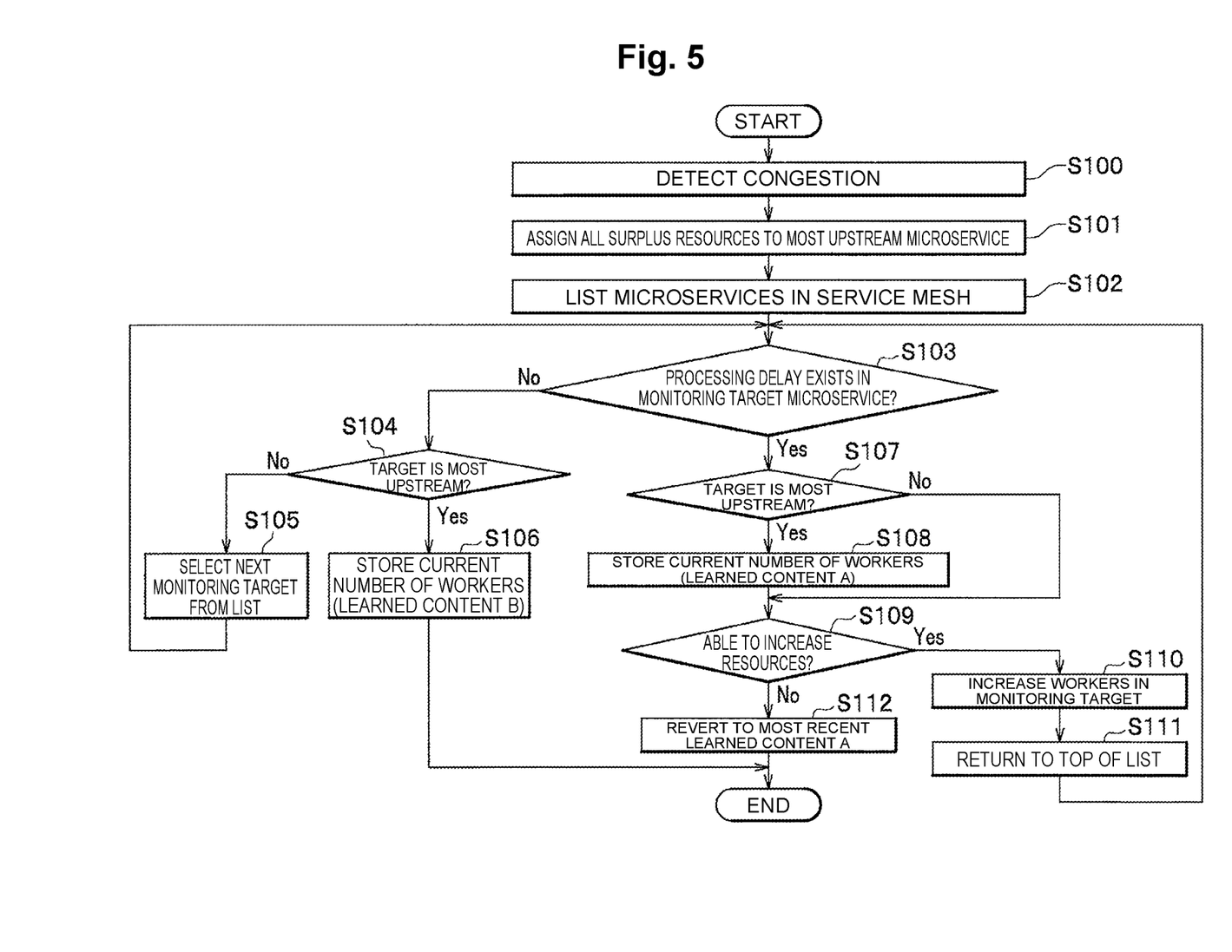
FIG. 5 is a flowchart illustrating a process by a master node when congestion occurs.

FIG. 5 is a flowchart illustrating a process by the master node 20 when congestion occurs.

In the master node 20, if the task processing monitoring unit 200 detects that congestion has occurred in the service mesh 11 (step S100: congestion detecting step), the worker allocation unit 204 assigns all surplus resources to the most upstream microservice 12A (step S101: worker allocating step).

Next, the master node 20 lists the microservices 12A to 12D in the service mesh 11 (step S102). The list contains the microservices 12A to 12D in the service mesh 11 arranged in order from the downstream side. For instance, in the example of FIG. 3, the list contains the most downstream microservice 12D, the microservice 12C, the microservice 12B, and the most upstream microservice 12A in the above order.

Next, in the master node 20, the task processing monitoring unit 200 monitors the task processing status of each master node 20 in the order of the list (that is, in order from the downstream side), and determines whether or not a task processing delay exists in the microservice 12 being monitored (step S103). Whether or not a task processing delay exists is indicative of whether or not a queue overflow is occurring in the case where the monitoring target is other than the most upstream microservice, and is indicative of whether or not all service requests are being processed as normal processing requests, or in other words whether or not errors are being returned, in the case where the monitoring target is the most upstream microservice (microservice 12A).

In the case where there is no task processing delay in the monitoring target (step S103: No), until the monitoring target is the most upstream microservice (step S104: No), the master node 20 selects the next monitoring target according to the list (step S105), and returns to step S103 to determine whether or not there is a task processing delay.

Also, in step S104, if the monitoring target is the most upstream microservice (step S104: Yes), or in other words if all service requests are being processed normally, the worker allocation learning unit 206 of the master node 20 stores the current number of workers (learned content B) in each microservice 12 (step S106), and ends the process according to the current flowchart.

The learned content B is a state in which each microservice 12 is scaled out correctly, all service requests are being processed normally without the need to return errors in the most upstream microservice, and tasks are being processed without a queue overflow occurring in the most downstream microservice 12. In other words, the learned content B is the worker allocation when congestion is cleared.

Also, in step S103, if there is a task processing delay in the monitoring target (step S103: Yes), the master node 20 determines whether or not the monitoring target is the most upstream microservice (step S107). In the case where the monitoring target is not the most upstream microservice (step S107: No), the flow proceeds to step S109.

In the case where the monitoring target is the most upstream microservice (step S107: Yes), the worker allocation learning unit 206 of the master node 20 stores the current number of workers (learned content A) in each microservice 12 (step S108).

The learned content A is a state in which at least a portion of the workers 16A in the most upstream microservice are returning errors and not all resources are devoted to normal processing, but tasks are being performed without a queue overflow occurring in the downstream microservice 12. In other words, the learned content A is a worker allocation in a state where congestion is not fully cleared but processing is stable on the downstream side.

The learned content A is stored together with the elapsed time since the congestion occurred, and is used when congestion occurs in the future. Moreover, the learned content A ultimately reaches the learned content B.

Next, the master node 20 determines whether or not to be able to increase the resources in the microservice 12 of the monitoring target (step S109: processing ratio determining step).

Whether or not to be able to increase the resources means whether or not service request retries are occurring as a result of reallocating a portion of the workers 16A in the most upstream microservice to the microservice 12 of the monitoring target in the case where the monitoring target is a downstream microservice 12 or as a result of raising the ratio of normal processing among the workers 16A in the case where the monitoring target is the most upstream microservice, or in other words whether or not there are insufficient resources for error return in the most upstream microservice.

In the case of being able to increase resources (step S109: Yes), the master node 20 increases (scales out) the number of workers by allocating a portion of the workers 16A in the most upstream microservice to the microservice 12 of the monitoring target in the case where the monitoring target is a downstream microservice 12, or raising the ratio of workers 16A performing normal processing in the case where the monitoring target is the most upstream microservice (step S110).

Additionally, the master node 20 sets the monitoring target back to the top of the list, or in other words the most downstream microservice (step S111), and returns to step S103 to determine whether or not there is a task processing delay. In this way, the master node 20 scales out a downstream microservice 12 or increases the ratio of normal processing in the most upstream microservice while also checking whether congestion occurs because of the scale out.

Also, in the case of not being able to increase the resources in step S109 (step S109: No), the master node 20 reverts the number of workers in each microservice 12 to the most recent learning result A stored by the worker allocation learning unit 206 (step S112), and ends the process according to the current flowchart.

Note that, although not illustrated in FIG. 5 because FIG. 5 is a flowchart of the master node 20, each worker 16 in the most upstream microservice 12A successively processes received service requests (service request processing step) on the basis of the ratio determined in the processing ratio determining step (step S109).

<Hardware Configuration>

Figure 6:
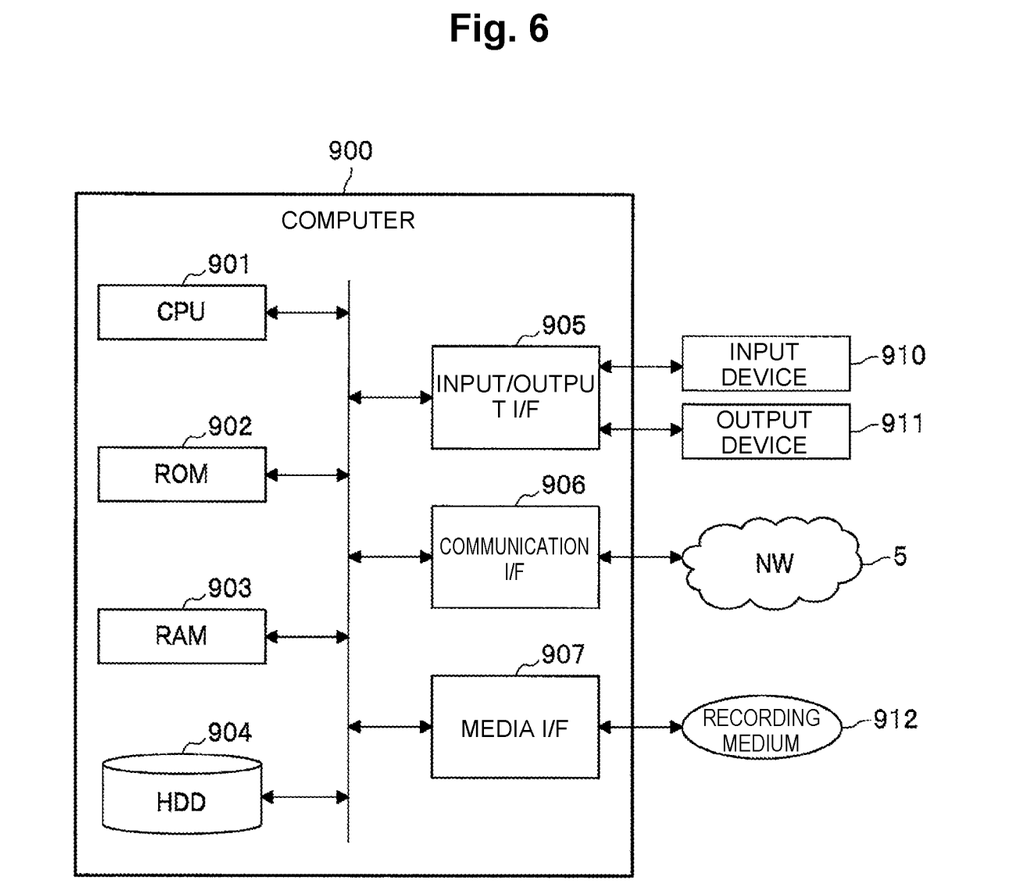
FIG. 6 is a hardware configuration diagram illustrating an example of a computer that achieves the functions of a load balancer, a worker, and a master node according to the present embodiment.

The load balancers 14, the workers 16, and the master node 20 according to the present embodiment are achieved by a computer 900 having a configuration like the one illustrated in FIG. 6, for example.

FIG. 6 is a hardware configuration diagram illustrating an example of the computer 900 that achieves the functions of the load balancers (14A to 14D), the workers (16A to 16D), and the master node 20 according to the present embodiment. The computer 900 includes a central processing unit (CPU) 901, read-only memory (ROM) 902, RAM 903, a hard disk drive (HDD) 904, an input/output interface (I/F) 905, a communication I/F 906, and a media I/F 907.

The CPU 901 operates and performs various types of control on the basis of a program stored in the ROM 902 or the HDD 904. The ROM 902 stores information such as a boot program executed by the CPU 901 when the computer 900 boots up and programs related to the hardware of the computer 900.

Through the input/output I/F 905, the CPU 901 controls an input device 910 such as a mouse or a keyboard, as well as an output device 911 such as a display or a printer. Through the input/output I/F 905, the CPU 901 acquires data from the input device 910 and also outputs generated data to the output device 911. Note that hardware such as a graphics processing unit (GPU) may also be used in conjunction with the CPU 901 as a processor.

The HDD 904 stores information such as a program executed by the CPU 901 and data used by the program. The communication I/F 906 receives data from another device through a communication network and outputs the data to the CPU 901, and also transmits data generated by the CPU 901 to another device through the communication network.

The media I/F 907 reads programs or data stored in a recording medium 912, and outputs to the CPU 901 through the RAM 903. The CPU 901 loads a program associated with an intended process from the recording medium 912 into the RAM 903 through the media I/F 907, and executes the loaded program. The recording medium 912 is an optical recording medium such as a Digital Versatile Disc (DVD) or a Phase-change rewritable Disk (PD), a magneto-optical recording medium such as a magneto-optical (MO) disc, a magnetic recording medium, a semiconductor memory, or the like.

For example, in the case where the computer 900 functions as the load balancers 14, the workers 16, and the master node 20 of the present invention, the CPU 901 of the computer 900 achieves the functions of the load balancers 14, the workers 16, and the master node 20 by executing a program loaded into the RAM 903. Additionally, the data in the RAM 903 is stored in the HDD 904. The CPU 901 reads out and executes a program associated with an intended process from the recording medium 912. Otherwise, the CPU 901 may also load a program associated with an intended process from another device through a communication network.

<Effects>

Hereinafter, effects of the service provision system and the like according to the present invention will be described.

The service provision system 10 according to the present invention is characterized by comprising: the service mesh 11 including the plurality of microservices 12 (12A to 12D) connected in series; and the master node 20 that manages each of the microservices 12, wherein each microservice 12 includes the plurality of workers 16 (16A to 16D) that perform predetermined task processing and the load balancer 14 (14A to 14D) that assigns a task received from upstream to one of the workers 16, the master node 20 includes the task processing monitoring unit 200 that monitors the task processing status in each of the microservices 12 and detects the occurrence of congestion in the service mesh 11, the worker allocation unit 204 that determines an allocation of the number of workers to each of the microservices 12, and the processing ratio determination unit 202 that determines, on the basis of the task processing status in each of the microservices 12, the ratio of requests on which to perform normal task processing and the requests for which to return an error to the source of the service request from among the service requests received by the most upstream microservice 12 (microservice 12A) positioned farthest upstream in the service mesh 11, the worker allocation unit 204 increases the number of workers in the most upstream microservice in the case where congestion occurs, and the workers 16A in the most upstream microservice process service requests on the basis of the ratio determined by the processing ratio determination unit 202.

In this way, when congestion occurs, the service provision system 10 increases the number of workers in the most upstream microservice, or in other words, the number of workers assigned to error return. This arrangement can reduce the number of service requests that the service provision system 10 discards without replying to, and prevent a retry storm of service requests.

Additionally, the service provision system 10 is characterized in that when the number of service requests received by the most upstream microservice falls after the congestion occurs, the worker allocation unit 204 reallocates the workers 16 from the most upstream microservice to a downstream microservice positioned downstream in the service mesh.

With this arrangement, the service provision system 10 can increase the resources for performing normal processing at the timing when a certain period has elapsed since the congestion occurred and fewer resources are needed for error return, and improve the processing capacity of the service provision system 10.

Also, the service provision system 10 is characterized in that the worker allocation unit 204 allocates workers 16 with priority given to the most downstream microservice positioned farthest downstream in the service mesh 11.

With this arrangement, the service provision system 10 can reliably process traffic that has reached the downstream side of the series of processes executed by the service mesh 11, and improve the processing efficiency of the system.

Also, the service provision system 10 is characterized by further comprising the worker allocation learning unit 206 that stores the number of workers in each microservice 12 before and after the reallocation of the workers 16 by the worker allocation unit 204, wherein if congestion occurs in any location in the service mesh 11 after the reallocation of the workers 16 and no workers 16 can be allocated to the affected location, the worker allocation unit 204 reverts the number of workers in each microservice 12 to that of before-reallocation on the basis of the number of workers stored in the worker allocation learning unit 206.

In this way, the service provision system 10 learns the number of workers in each microservice 12 before and after the reallocation of the workers 16, and if congestion occurs in any location after the reallocation of the workers and no additional workers 16 can be allocated to the affected location, the service provision system 10 reverts the numbers of workers on the basis of the learning result. With this arrangement, the service provision system 10 can dynamically set an optimal number of workers at each point in time and improve the processing efficiency of the system.

Additionally, the service provision system 10 is characterized in that when congestion occurs in the service mesh 11 in the future, the worker allocation unit 204 determines the number of workers in each microservice 12 on the basis of the number of workers stored in the worker allocation learning unit 206.

With this arrangement, the service provision system 10 can change the worker allocation to deal with congestion more rapidly and accurately.

Note that the present invention is not limited to the embodiments described above, and many modifications within the technical concept of the present invention are possible by persons having ordinary knowledge in the art.

REFERENCE SIGNS LIST

10 service provision system
11 service mesh
12 (12A to 12D) microservice
14 (14A to 14D) load balancer
16 (16A to 16D) worker
18 surplus worker
20 master node
200 task processing monitoring unit
202 processing ratio determination unit
204 worker allocation unit
206 worker allocation learning unit

The invention claimed is:

1. A service provision system comprising: a service mesh including a plurality of microservices connected in series; and a master node that manages each of the microservices, wherein each microservice includes a plurality of workers each including one or more processors, configured to perform predetermined task processing and a load balancer, including one or more processors, configured to assign a task received from upstream to one of the workers, the master node includes a task processing monitoring unit, including one or more processors, configured to monitor a task processing status in each of the microservices and detects an occurrence of congestion in the service mesh, a worker allocation unit, including one or more processors, configured to determine an allocation of a number of workers to each of the microservices, and a processing ratio determination unit, including one or more processors, configured to determine, on a basis of the task processing status in each of the microservices, a ratio of requests on which to perform normal task processing and requests for which to return an error to the source of a service request from among service requests received by a most upstream microservice positioned farthest upstream in the service mesh, the worker allocation unit is configured to increase the number of workers in the most upstream microservice in a case where the congestion occurs, and the workers in the most upstream microservice are configured to process the service requests on the basis of the ratio determined by the processing ratio determination unit.

2. The service provision system according to claim 1, wherein when the number of service requests received by the most upstream microservice falls after the congestion occurs, the worker allocation unit is configured to reallocate the workers from the most upstream microservice to a downstream microservice positioned downstream in the service mesh.

3. The service provision system according to claim 2, wherein the worker allocation unit is configured to allocate the workers with priority given to the most downstream microservice positioned farthest downstream in the service mesh.

4. The service provision system according to claim 2, further comprising:

a worker allocation learning unit, including one or more processors, configured to store the number of workers in each microservice before and after the reallocation of the workers by the worker allocation unit, wherein if the congestion occurs in any location in the service mesh after the reallocation of the workers and no workers can be allocated to the affected location, the worker allocation unit is configured to revert the number of workers in each microservice to that of before-reallocation on a basis of the number of workers stored in the worker allocation learning unit.

5. The service provision system according to claim 4, wherein when congestion occurs in the service mesh in the future, the worker allocation unit is configured to determine the number of workers in each microservice on a basis of the number of workers stored in the worker allocation learning unit.

6. A service provision method for a service provision system provided with a service mesh including a plurality of microservices connected in series, and a master node that manages each of the microservices, each microservice including a plurality of workers that perform predetermined task processing and a load balancer that assigns a task received from upstream to one of the workers, the service provision method being executed by using the master node, comprising:

a congestion detecting step of detecting that congestion is occurring at any location in the service mesh;

a worker allocating step of increasing the number of workers in a most upstream microservice positioned farthest upstream in the service mesh in a case where the congestion occurs;

a processing ratio determining step of determining, on a basis of a task processing status in each of the microservices, a ratio of requests on which to perform normal task processing and requests for which to return an error to the source of a service request from among service requests received by the most upstream microservice; and a service request processing step of causing the workers in the most upstream microservice to process the service requests on a basis of the ratio determined at the processing ratio determining step.

7. The service provision method according to claim 6, further comprising:

when the number of service requests received by the most upstream microservice falls after the congestion occurs, reallocating the workers from the most upstream microservice to a downstream microservice positioned downstream in the service mesh.

8. The service provision method according to claim 7, further comprising:

allocating the workers with priority given to the most downstream microservice positioned farthest downstream in the service mesh.

9. The service provision method according to claim 7, further comprising:

storing the number of workers in each microservice before and after the reallocation of the workers by the worker allocation unit; and if the congestion occurs in any location in the service mesh after the reallocation of the workers and no workers can be allocated to the affected location, reverting the number of workers in each microservice to that of before-reallocation on a basis of the number of workers stored in the worker allocation learning unit.

10. The service provision method according to claim 9, further comprising:

when congestion occurs in the service mesh in the future, determining the number of workers in each microservice on a basis of the number of workers stored in the worker allocation learning unit.

11. A master node that for managing a plurality of microservices connected in series to form a service mesh,
each microservice including
a plurality of workers that perform predetermined task processing and
a load balancer that assigns a task received from upstream to one of the workers,
the master node comprising:
a task processing monitoring unit, including one or more processors, configured to monitor a task processing status in each of the microservices and detects an occurrence of congestion in the service mesh;
a worker allocation unit, including one or more processors, configured to determine an allocation of a number of workers to each of the microservices; and
a processing ratio determination unit, including one or more processors, configured to determine, on a basis of the task processing status in each of the microservices, a ratio of requests on which to perform normal task processing and requests for which to return an error to the source of a service request from among service requests received by a most upstream microservice positioned farthest upstream in the service mesh, wherein
the worker allocation unit is configured to increase the number of workers in the most upstream microservice in a case where the congestion occurs, and
the processing ratio determination unit is configured to cause the workers in the most upstream microservice to process the service requests on a basis of the determined ratio.

12. The master node according to claim 11, wherein
when the number of service requests received by the most upstream microservice falls after the congestion occurs, the worker allocation unit is configured to reallocate the workers from the most upstream microservice to a downstream microservice positioned downstream in the service mesh.

13. The master node according to claim 12, wherein
the worker allocation unit is configured to allocate the workers with priority given to the most downstream microservice positioned farthest downstream in the service mesh.

14. The master node according to claim 12, further comprising:
a worker allocation learning unit, including one or more processors, configured to store the number of workers in each microservice before and after the reallocation of the workers by the worker allocation unit, wherein
if the congestion occurs in any location in the service mesh after the reallocation of the workers and no workers can be allocated to the affected location, the worker allocation unit is configured to revert the number of workers in each microservice to that of before-reallocation on a basis of the number of workers stored in the worker allocation learning unit.

15. The master node according to claim 14, wherein
when congestion occurs in the service mesh in the future, the worker allocation unit is configured to determine the number of workers in each microservice on a basis of the number of workers stored in the worker allocation learning unit.

16. A non-transitory computer-readable medium storing a program causing a computer to function as the master node according to claim 11.

* * * * *